United States Patent
Weih

(10) Patent No.: US 10,442,348 B2
(45) Date of Patent: Oct. 15, 2019

(54) MOLDED PART AND METHOD FOR PRODUCING A MOLDED PART

(71) Applicant: NOVEM Car Interior Design GmbH, Vorbach (DE)

(72) Inventor: Philipp Weih, Bayreuth (DE)

(73) Assignee: Novem Car Interior Design GmbH, Vorbach (DE)

( * ) Notice: Subject to any disclaimer, the term of this patent is extended or adjusted under 35 U.S.C. 154(b) by 286 days.

(21) Appl. No.: 15/367,819

(22) Filed: Dec. 2, 2016

(65) Prior Publication Data

US 2017/0158119 A1 Jun. 8, 2017

(30) Foreign Application Priority Data

Dec. 3, 2015 (DE) .................. 10 2015 121 006

(51) Int. Cl.
| | |
|---|---|
| *B32B 3/00* | (2006.01) |
| *B60Q 3/62* | (2017.01) |
| *B60Q 3/20* | (2017.01) |
| *B60R 13/02* | (2006.01) |
| *B60Q 3/54* | (2017.01) |
| *B60Q 3/64* | (2017.01) |
| *B60Q 3/14* | (2017.01) |

(52) U.S. Cl.
CPC .............. *B60Q 3/62* (2017.02); *B60Q 3/14* (2017.02); *B60Q 3/20* (2017.02); *B60Q 3/54* (2017.02); *B60Q 3/64* (2017.02); *B60R 13/02* (2013.01); *B60R 2013/0287* (2013.01)

(58) Field of Classification Search
CPC ... B60Q 3/14; B60Q 3/20; B60Q 3/54; B60Q 3/62; B60Q 3/64; B60R 13/02; B60R 2013/0287
See application file for complete search history.

(56) References Cited

U.S. PATENT DOCUMENTS

2002/0101738 A1   8/2002  Misaras

FOREIGN PATENT DOCUMENTS

| DE | 102011082344 A1 * | 3/2013 | ............ B60R 13/02 |
|---|---|---|---|
| DE | 102012110153 | 8/2013 | |
| DE | 102015102394 A1 | 8/2015 | |
| WO | 2011103692 | 9/2011 | |

* cited by examiner

*Primary Examiner* — Elizabeth E Mulvaney
(74) *Attorney, Agent, or Firm* — Workman Nydegger

(57) ABSTRACT

A molded part for a vehicle interior can comprise a carrier and a decorative layer with a rear side facing toward the carrier and with a front side formed as a visible side. The decorative layer has one or more light passages which extend along their respective longitudinal axis rectilinearly between rear side and front side and via which visible light can be conducted from the rear side to the front side of the decorative layer for the purposes of displaying a symbol on the front side. The longitudinal axes of the light passages are oriented obliquely with respect to the surface normal of the front side of the decorative layer at the outlet of the respective light passage at the front side of the decorative layer. The invention also relates to a method for producing a molded part, in particular a molded part according to the invention.

12 Claims, 2 Drawing Sheets

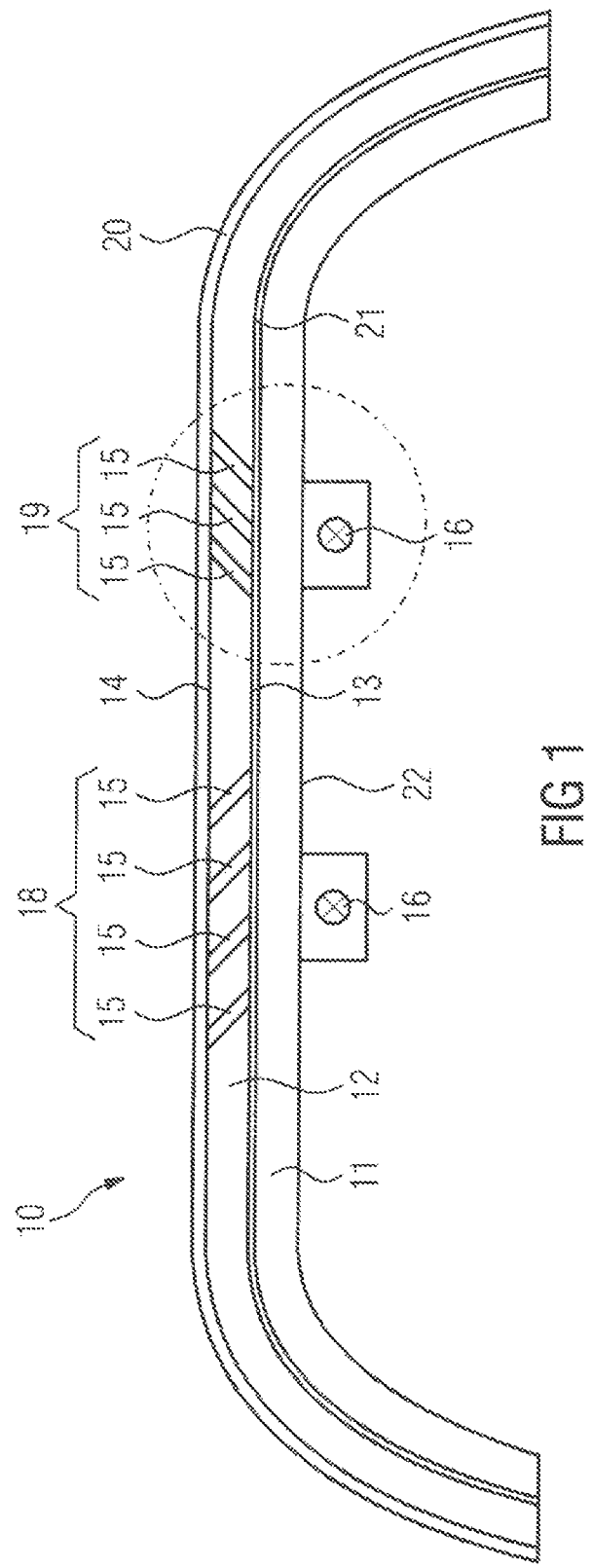

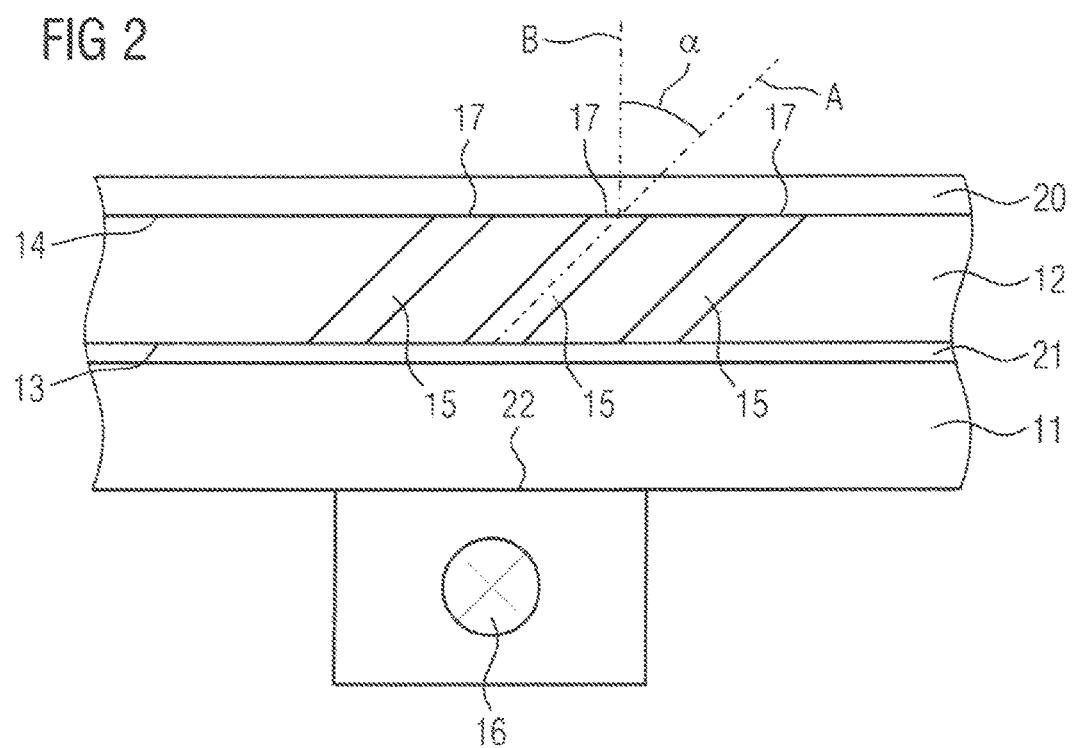

MOLDED PART AND METHOD FOR PRODUCING A MOLDED PART

CROSS-REFERENCE TO RELATED APPLICATIONS

The present invention claims priority to German Patent Application No. DE 102015121006.1 entitled "Molded Part and Method for Producing a Molded Part," filed Dec. 3, 2015, the entire content of which is incorporated herein by reference.

BACKGROUND OF THE INVENTION

1. The Field of the Invention

The invention relates to a molded part, in particular to a decorative part and/or panelling part, in the form of a molded part, for a vehicle interior, and to a method for producing a molded part, in particular said molded part.

2. Background and Relevant Art

Molded parts of said type comprise a carrier and a decorative layer with a rear side, which faces toward the carrier, and with a front side, which is formed as a visible side. The decorative layer has one or more light passages, in particular a multiplicity of light passages, which extend along their respective longitudinal axis rectilinearly between rear side and front side and via which visible light can be conducted from the rear side to the front side of the decorative layer, in particular for the purposes of displaying a symbol on the front side.

Numerous decorative and paneling parts, for example door panelings, dashboard and instrument panels, are installed in the vehicle interior. Decorative and paneling parts also include control buttons and/or the covers of control buttons.

In particular in the case of molded parts in motor vehicles, functional symbols are displayed on the front side of the decorative layer of the molded parts. In particular in the automotive sector, a symbol display is desirable which disappears in a non-functional state, that is to say for example when the associated lighting is switched off. That is to say, the symbol on the front side of the decorative layer is not visible, or is at least scarcely visible, even on close inspection, when for example the rear side of the decorative layer is not illuminated with light. In this case, the viewer sees only the decoration, without symbol. In a functional state, light is transmitted by the light passages to the front side, and there, in the illuminated state, the symbol appears as an illuminated fine symbol displayed by way of lines and/or dots and/or areas.

It is desired that, even in the functional state, the light that is conducted to the front side, in particular the symbol displayed by way of said light, does not need to, or should not, be seen from every viewing position. Thus, there are for example particular symbols which need to, or should, be visible only to the driver, and other symbols which need to, or should, be visible only to the front passenger or co-driver.

BRIEF SUMMARY OF THE INVENTION

The present invention is based on the object of specifying a novel molded part of the type mentioned in the introduction, in particular a molded part in the case of which the light conducted to the front side, in particular the symbol displayed by way of said light, is visible only from certain viewing positions even in the functional state. Furthermore, it is an object of the invention to specify a novel method for producing a molded part, in particular for producing a molded part according to the invention.

Said object is achieved, with regard to the molded part, by way of the features of the independent claims. Advantageous embodiments and refinements are specified in the respectively dependent claims.

The molded part according to the invention is characterized in that the longitudinal axes of the light passages are oriented obliquely with respect to the surface normal of the front side of the decorative layer at the outlet of the respective light passage at the front side of the decorative layer.

An oblique orientation is to be understood to mean that the longitudinal axis of each light passage does not run perpendicular to the front side of the decorative layer at the respective outlet point. The angle between the longitudinal axis of the respective light passage and the surface normal of the front side of the decorative layer at the associated outlet point of the light passage preferably lies between 1° and 89°, in particular between 20° and 70°, preferably between 30° and 60°, more preferably at approximately 45°.

Said light passages may be a material cutout in the decorative layer, which has been formed in for example by way of laser technology. Said material cutout may, though need not, be filled with a transparent or translucent material, for example with a lacquer. It is also possible for said light passages to involve light conductors that have been introduced into the decorative layer.

The cross section of said light passages is preferably selected to be so small that, in a non-functional state, that is to say for example when an associated light source is switched off, the outlet point is not visible, or is at least scarcely visible, even on close inspection, to a person viewing the front side of the decorative layer.

Aside from the abovementioned light passages, it is also possible for further light passages to be provided which do not entirely satisfy the stated criteria, the longitudinal axes of which, for example, are oriented perpendicular to the decorative layer at the respective outlet point at the front side of the decorative layer.

The advantages of the invention lie in particular in the fact that, owing to the oblique orientation of the light passages, the light conducted to the front side through said light passages is also emitted obliquely from the front side of the decorative layer, and can thus be seen only from viewing positions arranged in the region of said oblique emission profile. By contrast, from other viewing positions, said light cannot be seen or can at least be seen only relatively faintly, for example from viewing positions whose spacing line to the respective light outlet opening duly likewise runs obliquely with respect to the abovementioned surface normal of the decorative layer but with an obliquity oriented oppositely to the obliquity of the longitudinal axis of the respective light passage. Symbols displayed by way of said light are thus visible for example only to the driver of a motor vehicle, but are not visible, or are at least only faintly visible, to the front passenger. Thus, in the case of a molded part according to the invention, the light conducted to the front side, in particular the symbol displayed by way of said light, cannot be seen from every viewing position.

In a design variant of the invention, it is provided that multiple light passages form a first group of light passages, wherein all light passages of the first group of light passages have the same first orientation.

A refinement in this regard provides that multiple light passages form a second group of light passages, wherein all light passages of the second group of light passages have the same second orientation, wherein the second orientation differs from the first orientation, preferably runs substantially oppositely to the first orientation. Here, it is clear that it is possible for a light passage to not belong to the two groups.

"The same orientation" is to be understood to mean that the longitudinal axes of the light passages of a group run substantially parallel to one another. By way of the wording "substantially", customary manufacturing tolerances during the production of such light passages are encompassed.

According to the above statements, the second orientation differs from the first orientation if the light passages of the first orientation do not have the same orientation as the light passages of the second orientation, that is to say if the longitudinal axes of the light passages of the first group do not run parallel to the longitudinal axis of the light passages of the second group, wherein customary manufacturing tolerances during the production of the light passages are not encompassed by this.

"Opposite orientation" is to be understood to mean that, in the case of an imaginary parallel offset of the longitudinal axis of a light passage of the second group onto the outlet of one of the light passages of the first group at the front side of the decorative layer, the angles of the two longitudinal axes with respect to the surface normal of the decorative layer lie substantially in a plane and have a substantially identical magnitude but a different sign. In other words: the longitudinal axes are mirror-inverted with respect to one another about the surface normal.

In the case of a molded part in a motor vehicle, this embodiment has the advantage, for example, that the light passages of the first group may be oriented toward a provided driver's position, and the light passages of the second group may be oriented toward a provided front passenger position. In this way, certain symbols can be displayed exclusively to the driver, and other symbols can be displayed exclusively to the front passenger.

It is preferably the case that the decorative layer is formed from a light-impermeable material, in particular metal, preferably aluminum, or comprises said material. The carrier may be formed from a transparent and/or translucent material, in particular a transparent and/or translucent plastic, or comprise said material.

A protective layer may be provided on the front side of the decorative layer. Alternatively or in addition, an adhesive layer may be provided between the decorative layer and the carrier.

An expedient refinement of the invention provides that at least one light source for illuminating the light passages is provided. The light source may be arranged on the rear side of the carrier, preferably in the region of the light passages. It is however also possible for the light emitted by the light source to be conducted to the light passages via one or more light conductors.

The method according to the invention for producing a molded part, in particular a molded part according to the invention, comprises the steps: providing a decorative layer, in particular a decorative layer composed of a light-impermeable material, in particular metal, preferably aluminum; forming one or more light passages, in particular a plurality of light passages, into the decorative layer, preferably by way of laser technology, wherein the light passages are formed such that the light passages extend along their respective longitudinal axis rectilinearly between rear side and front side of the decorative layer, that light which is visible through the light passages can be conducted from the rear side to the front side of the decorative layer, in particular for the purposes of displaying a symbol on the front side, and that the longitudinal axes of the light passages are oriented obliquely with respect to the surface normal of the front side of the decorative layer at the outlet of the respective light passage at the front side of the decorative layer.

The advantages of the method according to the invention emerge from the above-described advantages of the molded part according to the invention.

In a refinement, the light passages are formed such that multiple light passages form a first group of light passages, wherein all light passages of the first group of light passages have the same first orientation.

A refinement in this regard provides that the light passages are formed such that multiple light passages form a second group of light passages, wherein all light passages of the second group of light passages have the same second orientation, wherein the second orientation differs from the first orientation, preferably runs substantially oppositely to the first orientation.

In a refinement, it may be provided that, after the formation of the one or more light passages into the decorative layer, a protective layer is provided on, in particular applied to, the front side of the decorative layer.

Furthermore, it may be provided that, after the formation of the one or more light passages, a carrier, in particular a carrier composed of a transparent and/or translucent material, preferably a transparent and/or translucent plastic, is attached to, in particular injection-molded onto, the rear side of the decorative layer.

Before the attachment of the carrier to the rear side of the decorative layer, an adhesive layer may be provided on, in particular applied to, the rear side of the decorative layer.

An expedient refinement provides that, after the attachment of the carrier to the rear side of the decorative layer, at least one light source is arranged, in particular on the rear side of the carrier, preferably in the region of the light passages.

BRIEF DESCRIPTION OF THE DRAWINGS

The invention will be discussed in more detail below, with regard also to further features and advantages, on the basis of the description of an exemplary embodiment and with reference to the appended schematic drawings, in which:

FIG. 1 is a schematic cross-sectional illustration of a first exemplary embodiment of the decorative part according to the invention, and FIG. 2 shows an enlarged detail of the region denoted by X in FIG. 1.

DETAILED DESCRIPTION OF THE PREFERRED EMBODIMENTS

FIG. 1 shows a decorative part and/or paneling part according to the invention, in the form of a molded part 10, for a vehicle interior, comprising a carrier 11 composed of light-permeable plastic, and a decorative layer 12 composed of light-impermeable aluminum. The decorative layer 12 has a rear side 13 facing toward the carrier 11 and has a front side 14 formed as a visible side.

The decorative layer 12 has multiple light passages 15 which extend along their respective longitudinal axis A rectilinearly between rear side 13 and front side 14 and via which visible light can be conducted from the rear side 13 to the front side 14 of the decorative layer 12 for the purposes of displaying a symbol on the front side 14. The light passages 15 have been formed into the aluminum of the decorative layer 12 by way of laser machining.

Two light sources 16 for the illumination of the light passages 15 are provided, which light sources are provided, in the region of the light passages 15, on a rear side 22 of the carrier 11.

As shown in FIG. 2, the longitudinal axis A of each of the light passages 15 runs obliquely with respect to the surface normal B of the front side 14 of the decorative layer 12 at the outlet 17 of the respective light passage 15 at the front side 14 of the decorative layer 12. The longitudinal axis A of each light passage 15 is thus not perpendicular to the front side 14 of the decorative layer 12 at the outlet 17, but rather encloses, at least in the present exemplary embodiment, an angle α of approximately 45° with the surface normal B of the front side 14 of the decorative layer 12 at the outlet 17 of the respective light passage 15. Any other desired angles between 1° and 89° are also possible, in particular angles between 20° and 70°.

FIG. 1 shows that a first group 18 of light passages 15 is provided, wherein all light passages 15 of the first group 18 of light passages 15 have the same first orientation, that is to say the longitudinal axes of the light passages 15 of the first group 18 run parallel to one another.

Furthermore, a second group 19 of light passages 15 is provided, wherein all light passages 15 of the second group 19 of light passages 15 have the same second orientation, wherein the second orientation runs oppositely to the first orientation. The longitudinal axes of the light passages 15 of the second group 19 thus run parallel to one another. However, the longitudinal axes of the light passages 15 of the second group 19, with regard to their orientation, run so as to be mirror-inverted about the surface normal B of the front side 14 of the decorative layer 12 in relation to the orientation of the longitudinal axes of the light passages 15 of the first group 18.

A protective layer 20 is provided on the front side of the decorative layer 12, and an adhesive layer 21 is provided between the decorative layer 12 and the carrier 11.

LIST OF REFERENCES

10 Molded part
11 Carrier
12 Decorative layer
13 Rear side
14 Front side
15 Light passage
16 Light source
17 Outlet
18 First group
19 Second group
20 Protective layer
21 Adhesive layer
22 Rear side
A Longitudinal axis
B Surface normal
α Angle

I claim:

1. A molded part for a vehicle interior, comprising:
   a carrier; and
   a decorative layer with a rear side facing toward the carrier and with a front side formed as a visible side;
   wherein the decorative layer has one or more light passages which extend along their respective longitudinal axis (A) rectilinearly between rear side and front side and via which visible light can be conducted from the rear side to the front side of the decorative layer, in particular for the purposes of displaying a symbol on the front side;
   wherein:
   the longitudinal axes (A) of the light passages are oriented obliquely with respect to the surface normal (B) of the front side of the decorative layer at the outlet of the respective light passage at the front side of the decorative layer;
   the carrier is formed from a transparent and/or translucent plastic; and
   said transparent and/or translucent plastic is injection-molded onto the rear side of the decorative layer.

2. The molded part according to claim 1, wherein:
   multiple light passages form a first group of light passages, wherein all light passages of the first group of light passages have the same first orientation.

3. The molded part according to claim 2, wherein:
   multiple light passages form a second group of light passages;
   all light passages of the second group of light passages have the same second orientation; and
   the second orientation differs from the first orientation.

4. The molded part according to claim 1, wherein:
   the decorative layer is formed from a light-impermeable material, or comprises said material.

5. The molded part according to claim 1, wherein:
   a protective layer is provided on the front side of the decorative layer; and/or
   an adhesive layer is provided between the decorative layer and the carrier.

6. The molded part according to claim 1, wherein:
   at least one light source for illuminating the light passages is provided.

7. A method for producing a molded part comprising the steps:
   providing a decorative layer; and
   forming one or more light passages into the decorative layer;
   wherein the light passages are formed such that:
   the light passages extend along their respective longitudinal axis (A) rectilinearly between rear side and front side of the decorative layer;
   light which is visible through the light passages can be conducted from the rear side to the front side of the decorative layer;
   the longitudinal axes (A) of the light passages are oriented obliquely with respect to the surface normal (B) of the front side of the decorative layer at the outlet of the respective light passage at the front side of the decorative layer; and
   after the formation of the one or more light passages, a carrier composed of a transparent and/or translucent material plastic is injection-molded onto the rear side of the decorative layer.

8. The method according to claim 7 wherein:
   the light passages are formed such that multiple light passages form a first group of light passages; and
   all light passage of the first group of light passages have the same first orientation.

9. The method according to claim 8, wherein:
   the light passages are formed such that multiple light passages form a second group of light passages;
   all light passages of the second group of light passages have the same second orientation; and
   the second orientation differs from the first orientation.

10. The method according to claim 7, wherein:
after the formation of the one or more light passages into the decorative layer, a protective layer is provided on the front side of the decorative layer.

11. The method according to claim 7, wherein:
before the attachment of the carrier to the rear side of the decorative layer, an adhesive layer is provided on the rear side of the decorative layer.

12. The method according to claim 7, wherein:
after the attachment of the carrier to the rear side of the decorative layer, at least one light source is arranged on the rear side of the carrier.

\* \* \* \* \*